Ackerman et al.

United States Patent

[15] 3,652,204
[45] Mar. 28, 1972

[54] PRODUCTION OF CHROMIUM-CONTAINING PHOSPHORIC ACID OR PHOSPHATE SOLUTION

[72] Inventors: Hakuichi Akazawa; Shigeaki Washio, both of Kokogawa, Japan

[73] Assignee: Taki Fertilizer Manufacturing Co., Ltd., Kokogawa, Japan

[22] Filed: Sept. 30, 1969

[21] Appl. No.: 862,508

[30] Foreign Application Priority Data

Oct. 12, 1968   Japan....................................43/74456

[52] U.S. Cl..................................................23/105, 106/66
[51] Int. Cl. ........................................................C01b 25/26

[58] Field of Search............................23/105, 165 B, 167, 51

[56] References Cited

UNITED STATES PATENTS 2,749,214   6/1956   Eickhoff et al. ............................23/51
3,085,875   4/1963   McCarroll ..............................75/101

Primary Examiner—Earl C. Thomas
Assistant Examiner—Gregory A. Heller
Attorney—Wenderoth, Lind & Ponack and V. M. Creedon

[57] ABSTRACT

Process for economically producing chromium-containing phosphoric acid solution by reacting phosphoric acid produced by the wet process, containing hydrofluosilicic acid, with a chromate and removing the precipitated silicofluoride.

6 Claims, No Drawings

PRODUCTION OF CHROMIUM-CONTAINING PHOSPHORIC ACID OR PHOSPHATE SOLUTION

This invention relates to the production of a phosphoric acid or its salt solutions containing chromium and more particularly to the production of a chromium-containing phosphoric acid or phosphate solution excellent in resistance to fire and heat.

It is already known that, if chromium is contained in a solution of acid phosphate of such metal as aluminum, magnesium, zinc or iron, the physical and thermal properties of the resulting solution will be improved (refer, for example, to U.S. Pat. No. 3,329,516). Thus, for example, there will be obtained such desirable improvements that the stability of the solution will increase, the viscosity of the aqueous solution (for use as a refractory binder) will increase so that aggregated will be able to be kneaded with a small amount of the binder, a film forming ability of the solution will be imparted at the normal temperature, the solution will become easy to dry in air so that no curing accelerator will be required, further the high temperature strength will not reduce while the reactivity with $SiO_2$ will reduce. Further, recently, it has become to be known that when such chromium-containing phosphate is applied, as a facing agent, to casting molds, there are obtained desirable properties, for example, in the absorption and insulation of radiant heat.

However, in the conventional process for producing such chromium-containing phosphate solution, very expensive raw materials as chromic anhydride and dry-phosphoric acid have been used (refer to the above-mentioned U.S. patent). Therefore, there has been an economical difficulty in the practical use of such chromium-containing solution.

Therefore, it is an object of the present invention to provide a process for producing a chromium-containing phosphate economically and efficiently by using industrially easily available cheap raw materials.

Another object of the present invention is to provide a process for producing a chromium-containing phosphate which contains reduced chromium (III) in any desirable amount by reducing chromium with a reducing agent or an organic substance present in a wet-process phosphoric acid solution (phosphoric acid solution resulting from the so-called wet-process).

A further object of the present invention is to provide a process for producing a chromium-containing phosphate by removing such impurities as hydrofluosilicic acid and/or its slat (except an alkali silicofluoride) present in a wet-process phosphoric acid solution by reacting them with an alkali metal present in a chromium source added to the phosphoric acid solution.

A still further object of the present invention is to produce a chromium-containing phosphate by using an alkali chromate or alkali polychromate as a chromium source and using a wet-process phosphoric acid solution as a phosphoric acid source.

Other objects of the present invention will become clearer from the following description.

Briefly, the present invention provides a process for producing a chromium-containing phosphoric acid or phosphate solution which comprises reacting a phosphoric acid and/or phosphate solution containing such impurities as hydrofluosilicic acid and/or it s salt (except an alkali silicofluoride) with a chromate or polychromate of an alkali metal, and then removing the formed precipitate.

Generally, in a wet-process phosphoric acid solution or phosphate solution, fluorine and silicon are contained almost in the form of silicofluoric acid (hydrofluosilicic acid). Usually its content is about 1.5 to 2.5 percent as fluorine or about 1.9 to 3.2 percent calculated as hydrofluosilicic acid. When, for example, sodium chromate or sodium dichromate is added to such solution, the corresponding alkali silicofluoride will be precipitated as shown in the following formulas. Therefore, hydrofluosilicic acid and/or its salt in the phosphoric acid source may be removed in the form of the alkali silicofluoride.

$$SiF_6^{--}+Na_2CrO_4 \rightarrow Na_2SiF_6+CrO_4^{--} \quad (1)$$
$$SiF_6^{--}+Na_2Cr_2O_7 \rightarrow Na_2SiF_6+Cr_2O_7^{--} \quad (2)$$

The here produced chromic acid or dichromic acid is present in the acid solution and shows strong oxidizing force so that, with the slightest heat (for example, the reaction heat generated in the reactions shown in the above formula (1) or (2)), the organic substances (for example, those contained in an amount of about 0.15 percent as fuminic substances) contained in the wet-process phosphoric acid or its salt and will be decomposed into carbon dioxide, water or nitrogen. When a hydrocarbon $(-CH_2-)_n$ is taken as an example, the following reactions would occur:

$$(-CH_2-)_n+2_nH_2CrO_4+6_nH_3PO_4 \rightarrow 2_nCr(H_2PO_4)_3+6_nH_2O+nCO_2 \quad (3)$$

$$(-CH_2-)_n+nH_2Cr_2O_7 6_nH_3PO_4 \rightarrow 2_nCr(H_2PO_4)_5+5_nH_2O+nCO_2 \quad (4)$$

As shown in the above formulas, chromic acid or dichromic acid, while oxidizing an organic substance, becomes itself a trivalent chromium ion, which is then combined with an acid radical in phosphoric acid or its salt and becomes a metallic ion constituting a part of a salt.

Thus, according to the process of the invention, a chromium-containing phosphoric acid or its salt solution can be reasonably produced by utilizing the characteristics of an alkali chromate or alkali dichromate.

As chromates and polychromates of alkali metals to be used in the present invention, there can be enumerated not only the above-mentioned sodium chromate and sodium dichromate but also, for example, potassium chromate, potassium dichromate, potassium trichromate, sodium trichromate, sodium tetrachromate and potassium tetrachromate. These may be obtained usually by extracting chromium ores with alkalis and they are industrial starting materials for varius chromium compounds (for example, chromic anhydride). Therefore, they are readily available nonexpensive materials.

Further, as phosphoric acid and/or phosphate solutions containing impurities to be used in this invention, any of the following materials may be used:

1. A general wet-process phosphoric acid solution containing impurities such as fluorine and an organic substance, or an acid phosphate solution obtained therefrom, for example, a solution of an acid phosphate of a metal higher than bivalent such as acid aluminum phosphate, acid zinc phosphate, acid magnesium phosphate or acid iron phosphate.
2. A material similar to the solution mentioned in (1) above, for example, a water extract of calcium superphosphate.
3. A material prepared by adding hydrofluosilicic acid and/or its salt (except an alkali silicofluoride) to (1) or (2) above. In this case (3), it is possible to obtain a chromium-containing solution with a desirable chromium content suitable for the particular use.

The form of phosphoric acid may be condensed phosphoric acid or its salt.

In carrying out the present invention, to any of the above-mentioned phosphoric acid sources, there is added the above-mentioned chromium source usually in an amount substantially equivalent to hydrofluosilicic acid contained in the phosphoric acid source. The reaction may be conducted at the normal temperature. In this case, fluorine in the phosphoric acid source will be precipitated as is shown in the before indicated formula (1) or (2) and the chromium source will be present as dissolved in the phosphoric acid source solution as a chromic acid or polychromic acid. Usually, the produced precipitate (alkali silicofluoride) is separated immediately. However, if desired, it may be separated after the below-described oxidizing treatment of the organic substance.

Then, under heating, the organic substances in said solution are decomposed into carbon dioxide or the like, which are removed. This treatment may be carried out by applying a proper external heat or may be carried out simultaneously with the above-mentioned precipitate-forming reaction step by properly adjusting the temperature. Further, in some cases, the decomposition of the organic substances can be conducted by utilizing neutralization heat. Thus, for example, in case a phosphoric acid solution is used as the phosphoric acid source, a metal such as aluminum is added to the solution depending on the particular use. Therefore, the organic substances may be decomposed by utilizing the reaction heat in such case. By the way, the form of the metal to be added here may be hydroxide, oxide or elemental metal powder. Another advantage in such case is that the decomposition of such metal (e.g., aluminum) source is more easily accomplished due to the presence of chromic acid.

In the above decomposing reaction, chromic acid or polychromic acid is reduced in response to the amount of the organic substances. However, in case it is further necessary, the reduction may be advanced to any desired extent by adding a proper reducing agent such as starch or a saccharide. For example, generally, in case the resulting solution is to be used as a refractory binder, it is preferable that hexavalent chromium is substantially completely reduced. Further, in case the resulting solution is to be applied as a facing agent for a casting mold, chromium may be left in the form of hexavalent chromium to a considerable degree so as to retain the oxidizing force. Therefore, the reduction may be carried out accordingly.

As described above, the feature of the present invention is to use a phosphoric acid or its salt solution containing impurities (e.g., hydrofluorosilicic and/or its salt, except alkali silicofluoride) as a phosphoric acid source and also a chromate or polychromate of an alkali metal as a chromium source. If only either one of these materials is used but, for the other, conventional chromic anhydride or dry-phosphoric acid is used, various troubles will be inevitable. For example, if trivalent chromium is added to an impure phosphoric acid or its acid salt solution, the fluorine and organic substances contained in the phosphoric acid source will volatilize in course of the production of materials resistant to fire and heat causing not only the formation of undesirable porous fire-resistant (refractory) material but also reduction in the mechanical strength. Therefore, in such case, it is necessary to remove fluorine in the wet-phosphoric acid or its acid salt solution beforehand with a carbonate or hydroxide of an alkali metal, and also to remove the organic substances therein by the treatment with such active adsorbent as active carbon. However, such would incur additional expenses and the process will necessarily become troublesome so that it will be difficult to economically obtain a chromium-containing phosphate solution.

The present invention will be explained by means of the following examples:

EXAMPLE 1

45.7 kg. of sodium dichromate dihydrate were added at the normal temperature into 875 kg. of a wet-process phosphoric acid solution containing 28.5% $P_2O_5$, 2.0% F and 0.15 percent of organic substances, and the mixture was reacted while stirring for 30 minutes. The sodium silicofluoride precipitate thus formed was separated by filtration. The filtrate was heated to 60° C. and 102.2 kg. of aluminum hydroxide (58.5% $Al_2O_3$) were added thereto. After 45 minutes, the temperature of the reaction mixture became 95° C., and the aluminum hydroxide had been perfectly decomposed and removed. Further, while the above-mentioned solution was being stirred, a solution prepared by dissolving 7 kg. of starch in 10 kg. of water was gradually added thereto. After the addition of the starch, bubbling occurred. In about 30 minutes, the bubbling ended. The stirring was further continued for 30 minutes to obtain 1,020 kg. of a product solution. The composition of the product was 24.4% $P_2O_5$, 5.85% $Al_2O_3$, 2.31% $Cr_2O_3$ and 0.49% F. Its physical properties were a pH of 1.42, specific gravity of 1.421 at 30° C. and viscosity of 44.0 centipoises at 30° C.

EXAMPLE 2

One hundred and seventy grams of a 20-percent aqueous solution of sodium chromate were added at the normal temperature to 1,000 g. of a wet-process phosphoric acid solution containing 29.3% $P_2O_5$, 2.4% F and 0.1 percent of organic substances, and the mixture was stirred for 30 minutes. The formed precipitate (sodium silicofluoride) was separated by filtration. The filtrate was heated to 60° C. and 120 g. of aluminum hydroxide (58.5% $Al_2O_3$) were added thereto. After 1 hour, the temperature of the system was 90° C. and the aluminum hydroxide had been completely dissolved. The chromium compound substantially became an orange brown hexavalent chromic acid ion and was partly green trivalent chromium. The composition of 1,220 g. of the resulting product was 23.4% $P_2O_5$, 5.6% $Al_2O_3$, 2.5% $Cr_2O_3$ and 0.51% F. Its physical properties were a pH of 1.24, specific gravity of 1.415 and viscosity of 21.5 centipoises at 30° C.

EXAMPLE 3

Fifty grams of a 15-percent acid aluminum silicofluoride solution and 63.5 g. of potassium dichromate were added to 1 kg. of a phosphoric acid solution (28.0% $P_2O_5$ and 1.9% F) produced from calcined rocks. The precipitated potassium silicofluoride was separated by filtration. The filtrate was heated to 90° C. and 5 g. of cane sugar were gradually added thereto to produce a chromium-containing phosphate solution. The product contained hexavalent chromium and trivalent chromium as chromium compounds. The product was 1,030 g., its composition was 25.7% $P_2O_5$, 0.83% $Al_2O_3$, 3.2% $Cr_2O_3$ and 0.48% F and its physical properties were a pH of 0.88, specific gravity of 1.40 and viscosity of 18.3 centipoises at 30° C.

What we claim is:

1. A process for producing a chromium-containing phosphoric acid solution or its salt solution which comprises reacting a phosphoric acid solution containing hydrofluosilicic acid or its salts other than alkali metal silicofluorides or a phosphate solution containing hydrofluosilicic acid or its salts other than alkali metal silicofluorides with a chromate or polychromate of an alkali metal and removing the precipitated alkali metal silicofluoride.

2. A process according to claim 1, wherein, after the removal of the precipitated alkali metal silicofluoride, the chromate or polychromate in the filtrate is reduced with a starch or a saccharide.

3. A process according to claim 1, wherein said phosphoric acid solution is a wet-process phosphoric acid solution.

4. A process according to claim 1, wherein said alkali metal is sodium.

5. A process according to claim 1, wherein said alkali metal is potassium.

6. A process according to claim 1, wherein said phosphate solution is an aluminum phosphate solution.

* * * * *